United States Patent [19]
Arps et al.

[11] Patent Number: 5,787,068
[45] Date of Patent: Jul. 28, 1998

[54] METHOD AND ARRANGEMENT FOR PREVENTING UNAUTHORIZED DUPLICATION OF OPTICAL DISCS USING BARRIERS

[75] Inventors: Mark A. Arps, Woodbury, Minn.; Jon Blixt, Fremont, Calif.

[73] Assignee: Imation Corp., Oakdale, Minn.

[21] Appl. No.: 740,340

[22] Filed: Nov. 7, 1996

[51] Int. Cl.$^6$ ........................................ G11B 7/00
[52] U.S. Cl. ........................ 369/275.3; 369/54; 369/32
[58] Field of Search ........................ 369/48, 58, 54, 369/275.4, 32, 53, 56, 275.3

[56] References Cited

U.S. PATENT DOCUMENTS

| | | | |
|---|---|---|---|
| 4,452,748 | 6/1984 | Lange et al. | 264/25 |
| 4,595,950 | 6/1986 | Löfberg | 358/122 |
| 5,023,854 | 6/1991 | Satoh et al. | 369/32 |
| 5,040,165 | 8/1991 | Taii et al. | 369/44.26 |
| 5,173,886 | 12/1992 | Satoh et al. | 369/32 |
| 5,346,654 | 9/1994 | Kodaka et al. | 264/1.33 |
| 5,428,598 | 6/1995 | Veldhuis et al. | 369/275.3 |
| 5,444,686 | 8/1995 | Dunlavy | 369/48 |
| 5,453,968 | 9/1995 | Veldhuis et al. | 369/84 |

FOREIGN PATENT DOCUMENTS

| | | |
|---|---|---|
| 545472 | 6/1993 | European Pat. Off. . |
| 621529 | 10/1994 | European Pat. Off. . |
| 635828 | 1/1995 | European Pat. Off. . |
| 637023 | 2/1995 | European Pat. Off. . |
| 298447 | 4/1995 | European Pat. Off. . |
| 411525 | 10/1995 | European Pat. Off. . |
| 697699 | 2/1996 | European Pat. Off. . |
| 4312922 | 10/1993 | Germany . |
| 4242247 | 6/1994 | Germany . |
| 4311683 | 10/1994 | Germany . |
| 4433868 | 5/1995 | Germany . |
| 61-1123026 | 6/1986 | Japan . |
| 61-195147 | 8/1986 | Japan . |
| 62-233293 | 10/1987 | Japan . |
| 63-182316 | 7/1988 | Japan . |
| 2007248 | 1/1990 | Japan . |
| 5135412 | 6/1993 | Japan . |
| 6084210 | 3/1994 | Japan . |
| 6274946 | 9/1994 | Japan . |
| 6297854 | 10/1994 | Japan . |
| 7085574 | 3/1995 | Japan . |
| 7144351 | 6/1995 | Japan . |
| 7182766 | 7/1995 | Japan . |
| 7235130 | 9/1995 | Japan . |
| 7272274 | 10/1995 | Japan . |
| 07296492 | 11/1995 | Japan . |
| 8007340 | 1/1996 | Japan . |
| 8020883 | 1/1996 | Japan . |
| WO9518433 | 7/1995 | WIPO . |
| WO9528704 | 10/1995 | WIPO . |
| WO 95/31807 | 11/1995 | WIPO . |
| WO96000963 | 1/1996 | WIPO . |

OTHER PUBLICATIONS

Financial Times, various articles, dated Apr., May and Jul. of 1995.

Helgerson, Linda W., *More Than You Probably Want to Know About CD Technology*, (5 pages) undated.

*Primary Examiner*—Nabil HIndi
*Attorney, Agent, or Firm*—Eric D. Levinson

[57] ABSTRACT

An optically-readable data disc includes piracy-protection featuring noncontiguously sequenced data files in zones separated by head-derailing barriers. The disc includes a plurality of data-placement zones and read-blocking barriers constructed along the spiral track over gaps which separate the zones. Data files are recorded in each of the zones, and an address-information data file includes data which identifies addresses of data files to be sequentially read in noncontiguous zones. By arranging the data files noncontiguously with barriers in gaps between the data files, efforts to duplicate the master disc by attempting to read the data files contiguously are deterred and/or prevented.

13 Claims, 4 Drawing Sheets

5,787,068

METHOD AND ARRANGEMENT FOR PREVENTING UNAUTHORIZED DUPLICATION OF OPTICAL DISCS USING BARRIERS

FIELD OF THE INVENTION

The present invention relates generally to the field of optical data discs and, more particularly, to the encryption of data on the disc for purposes of preventing unauthorized copying.

BACKGROUND OF THE INVENTION

Optical data discs are an increasingly popular media choice for the distribution and accessing of large volumes of data. This includes audio and video program material, as well as computer programs and data. Optical data discs include, for example, audio compact discs (also known as audio CDs), CD-ROMs, DVDs (digital video/versatile discs) videodiscs, and various types of magneto-optical discs. Optical discs are generally produced by making a master which has data features or patterns representing the data formed in or on a reference surface therein. The master is used to make a stamper which, in turn, is used to make production quantities of replicate discs, each containing the data which was formed in the master. The high data capacity, convenience and relatively low cost of such discs, have contributed to their success and acceptance in the marketplace.

Unfortunately, as with virtually every other form of information recording, optical data discs are susceptible to unauthorized reproduction. This issue is becoming more widely recognized with the increasing availability and affordability of equipment for optical disc reproduction. Indeed, this piracy problem is expected to get worse as copying technology gets less expensive.

Recognizing this as a serious impediment to business interests, there have been various implementations to inhibit such copying. Some optical discs are protected in a limited way by software encryption programs in which data is recorded onto and read from the disc using an encryption algorithm. In other implementations, optical discs are protected by attaching electronic security devices to the discs. Such devices have included optical thin films, holograms, gratings and micro-prisms. Certain compact discs, CD-ROMs and other optical media are protected to a more limited extent by visually-detectable indicia such as logos that are applied to the optical disc. Other forms of security devices have included optically-variable thin-film security devices, and optical interference authenticating masks which are patterned into the disc during a mask deposition or mask removal step.

Such security devices and techniques are difficult and/or expensive to implement. Moreover, in a number of these implementations, the security can be readily breached.

Accordingly, there is need for an optical disc recording/reading implementation having a piracy-protection feature which overcomes the aforementioned-mentioned deficiencies of the prior art.

SUMMARY OF THE INVENTION

The present invention is directed to an optically-readable data disc having piracy-protection to prevent unauthorized reproduction of data recorded on the disc.

According to one embodiment of the present invention, the disc includes a plurality of data-placement zones, and read-blocking barriers constructed along the data-read track over gaps which separate the zones. Data files are recorded in each of the zones, and an address-information data file includes data which identifies addresses of data files to be sequentially read in noncontiguous zones. Arranging the data files noncontiguously with barriers located between the zones inhibits unauthorized disc duplication by derailing the optical heads attempting to read sequential data files contiguously.

According to another specific embodiment of the present invention, an optically-readable data disc having at least one track along which data is recorded in the form of optically-readable patterns, includes: a plurality of data-placement zones along the track and including optically-readable data; at least one test data file located along the track and between two adjacent zones; at least one read-blocking barrier, located along the track and separating the data-placement zones, constructed and arranged to derail sequential reading of two data files arranged adjacent to one another along the track; a plurality of data files recorded along said at least one track in selected ones of the data-placement zones; and an address-information data file including data which identifies addresses of data files to be sequentially read in noncontiguous zones. The read-blocking barrier is co-located across the track with the test data file and, if the disc is authentic, the barrier corrupts the test data file.

In more specific embodiments, the read-blocking barrier is constructed as either a pit in the track or erected, for example, by hot stamping onto the track.

In yet another embodiment, the present invention is directed to a method for constructing an optical data disc. The method includes: providing a substrate having at least one side thereof designated for retaining representations of optically-read data; imprinting onto the one side a series of pits along at least one track with designated locations between selected adjacent series of pits, the pits representing digital data and at least one series of pits representing an address-information data file including data which identifies addresses of data files to be sequentially read in noncontiguous zones; and applying read-blocking barriers at the designated locations.

A laser-application process may be used to construct and locate the barriers so as to provide a unique and nonrepeatable pattern of the barriers. This pattern can then be used for tracing authentication much like a fingerprint.

The above summary of the present invention is not intended to describe each illustrated embodiment or implementation of the present invention. This is the purpose of the figures and the detailed description which follows.

BRIEF DESCRIPTION OF THE DRAWINGS

Other aspects and advantages of the present invention will become apparent upon reading the following detailed description and upon reference to the drawings in which.

Figure 1:
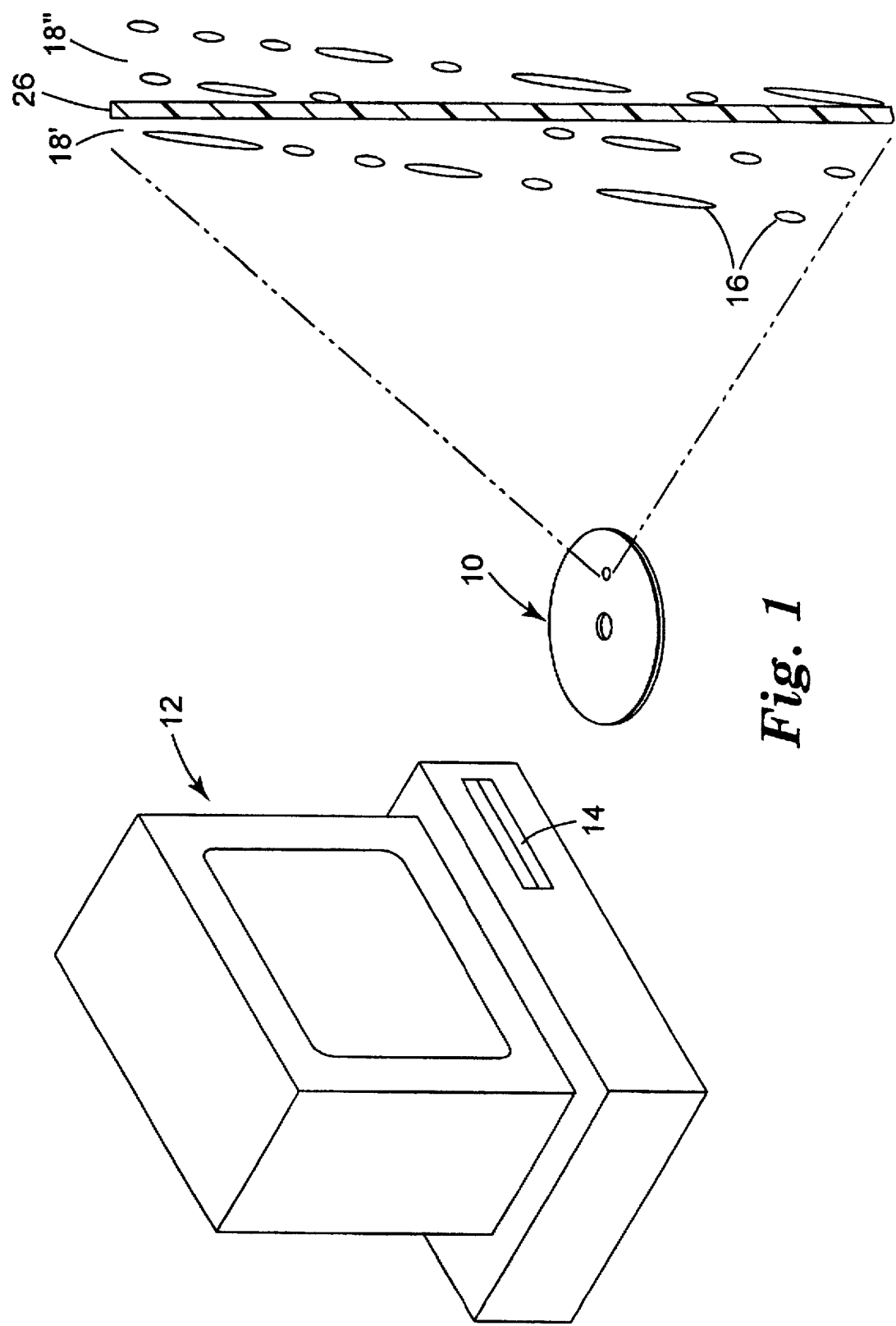
FIG. 1 is a perspective illustration of a computer arrangement including an optically-readable disc, constructed in accordance with the principles of the present invention, with a portion of the disc shown in expanded form.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE ILLUSTRATED EMBODIMENTS

The present invention is believed to be generally applicable to various types of optically-readable data discs. In applications requiring the production and/or sale of software on CD-ROM optical discs, the present invention is particularly advantageous for the purpose of deterring and/or preventing unauthorized reproduction of data from a master CD-ROM optical disc. Thus, it is this context of CD-ROM optical discs in which embodiments of the present invention are described.

Figure 2:
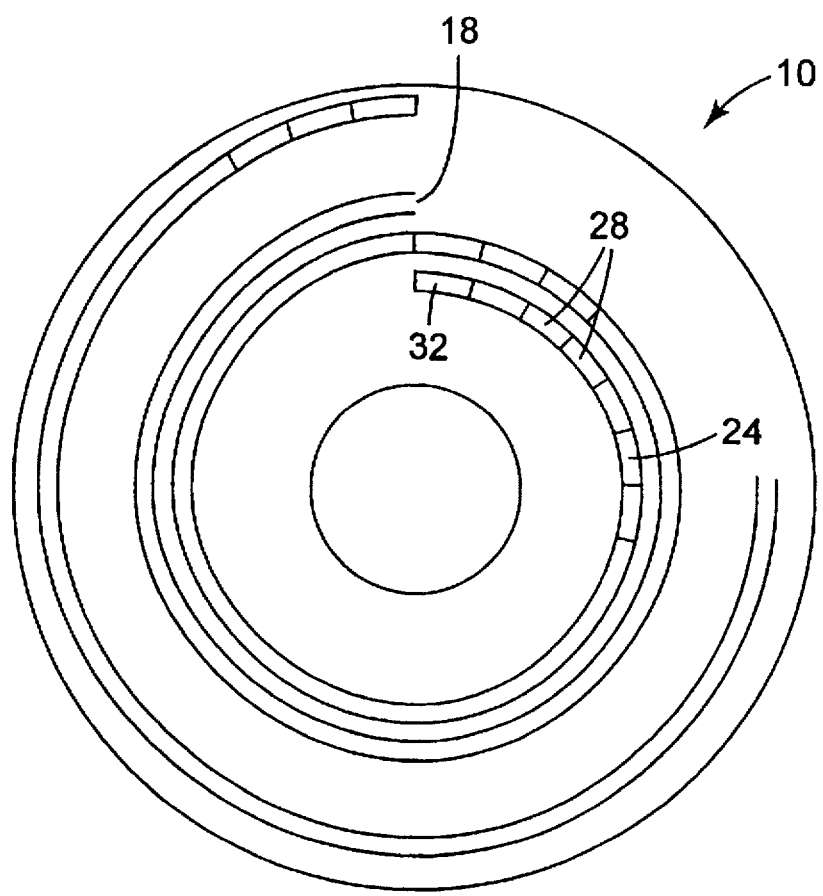
FIG. 2 is a top conceptual view of the optical disc shown in FIG. 1.

Turning now to the drawings, FIG. 1 illustrates a master CD-ROM optical disc 10 situated to be read by a conventional personal or business computer system 12 having installed therein a CD-ROM drive 14. To the side of FIG. 1, an expanded view of a portion of the disc is shown with data recorded on the disc in the form of a series of pits 16 of variable length. The disc 10 of FIG. 1 is shown from a top perspective in FIG. 2 with the data recorded thereon along a continuous spiral track, depicted as 18 in FIG. 2 and as sections 18' and 18" of the track 16 in FIG. 2. Except for discretely-placed locations or gaps 24 providing an area between certain adjacent data files for barriers 26 (FIG. 1) and a noncontiguous arrangement of data files in zones 28, the data is recorded along the track 18 in a conventional manner. While the spiral track is continuous, no used data is recorded at the gaps 24.

The barriers are implemented, for example, by laser recording one or more concentric circles (or a "dash pattern" interrupted circle) through and across the gap 24 in the track 16, and are designed to disrupt the sequential, contiguous reading of the spiral data track.

These barriers do not interfere with conventional pointer-directed reading of the track. Indeed, it is an important attribute of the present invention that the data represented by the pits 22 be arranged so that a conventional computer system 12 be capable of reading the recorded data without requiring specially-written software for controlling the disc drive.

Figure 3:
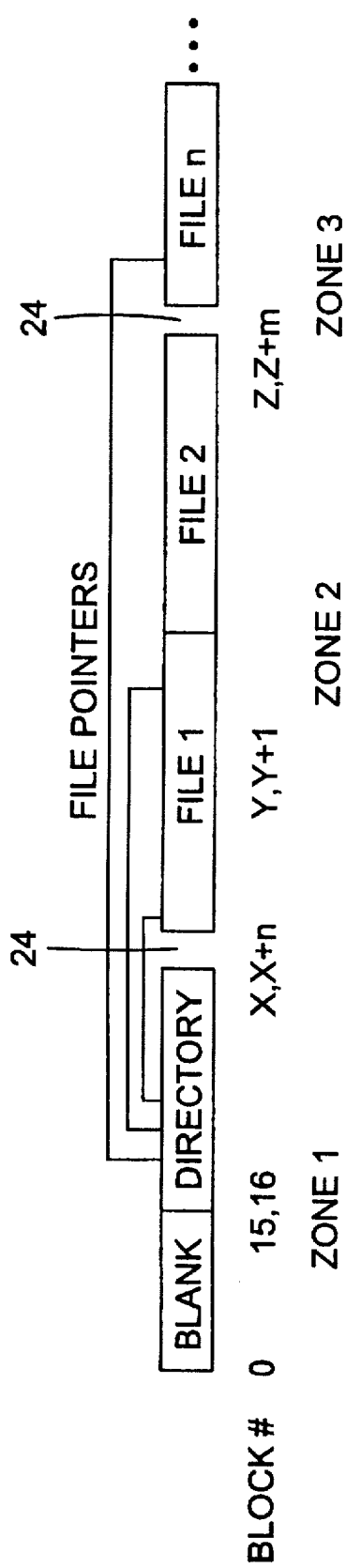
FIG. 3 is an illustration showing a form of organizing and recording data on the optical disc of FIG. 1, in accordance with the present invention.

FIG. 3 illustrates a file format, in accordance with the present invention, for recording data which permits reading of the recorded data using conventional disc drive equipment and software. Information concerning the location of the recorded data files is stored at a beginning section 32 (FIG. 2) of the spiral track 18 in path and directory tables as with conventional CD-ROM discs formatted with the standard ISO 9660 file system. This directory structure is usually located at the start of the disc and allows locating the addresses of the files on the disc via pointers to the first logical block of the file. With such a standard disc layout, consecutive files are located in consecutive blocks, with the next file starting exactly one block after the previous one ended.

Accordingly, after accessing the path and directory tables at the beginning of the spiral track, the optical head (or laser readback head for a CD-ROM drive) is directed to read a sequence of data files which are identified by the path and directory tables. The relative movement of the optical head with respect to the track is relatively fast when the drive is attempting to locate the data file(s) to be read and, after locating the data file(s), is relatively slow while reading the data file(s). This conventional approach for locating and reading data files is fully compatible with the present invention.

In connection with the present invention, it has been discovered that the above-discussed approach for locating and reading data files is useful not only for maintaining compatibility, but also for preventing unauthorized copying. As illustrated in FIG. 3, the CD-ROM is constructed with pointers that direct the optical head to read the data files noncontiguously along the data track and with one or more barriers in gaps between selected ones of the data files. The pointers force a noncontiguous reading of the data files so that large volumes of data files cannot be read (and copied) without the optical head searching for the location of the next sequential file to be read at the higher "locate" speed. The barriers are located in selected gaps between data-containing zones to inhibit an optical head from reading the data sequentially, without regard to the logical structure of the data files.

It has been discovered that an optical head derails from the track 18 while attempting to read two data files separated in this manner by a barrier located at a gap between the two data files. During an authorized read of the disc 10, the pointers instruct the optical head to read the data files noncontiguously, with the optical head skipping over the barriers in the fast "locate" mode before slowing down to read the next data file. Thus, in accordance with the present invention, the physical barriers render it difficult for the optical head to pass standard playback speed, but permit the optical head to pass during high-speed access (search/locate) when no data is being read.

In the embodiment illustrated in FIG. 3, gaps 24 are placed between valid data files to separate the zones in which data is placed and to provide an area in which the barriers are created. One aspect of this embodiment is to implement these gaps 24 as non-used data, such that the data file structure directs the reading head to skip over this non-used data. In this manner, the user data is not lost when writing over the gaps 24 with the barriers. The barrier 26 is then constructed as a continuous or segmented read-blocking structure at an angle across the spiral track so as to derail the optical head from reading data along the track. In a laser-recording application, the barrier 26 is implemented as a circle with minimal or no changes in the laser recording equipment. In another embodiment, the barrier 26 is implemented at a less acute angle with respect to the spiral track.

For either approach, the barrier structure crosses the data track to inhibit sequential data reads, and the number of data track crossings is selected based on the equipment used to implement the barrier structure, and the degree of piracy-protection desired. As mentioned above, for a laser recording approach, concentric circles facilitate information of the barrier structure. This permits a significant number of track crossings. However, this also reduces the disc capacity for storage of user data.

As an alternative approach, the barrier structure is implemented as a series of dashed structures (hills or pits), e.g., with a 50% duty cycle, to make visual detection of the barrier difficult.

All data files do not have to be separated by a gap. Rather, by using a gap between only those data files previously designated to be at zone borders, the number of gaps can vary from a lower limit of one to an upper limit in which each data file is located its own zone.

Figure 4:
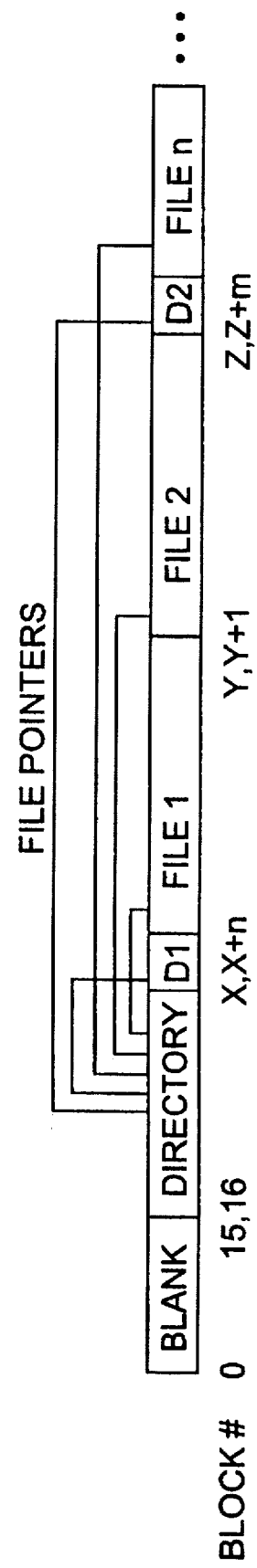
FIG. 4 is an illustration showing an alternative form of organizing and recording data on the optical disc of FIG. 1, in accordance with the present invention.

FIG. 4 illustrates an alternative embodiment in which the gaps 24 are constructed and arranged as a "decoy" file, with the other aspects of FIG. 3 remaining unchanged. According to one aspect of this embodiment, the decoy file represents a relatively small data file (e.g., about one thousand bits in length). After creation of the decoy file, implementation of the barrier at the gap corrupts the integrity of the stored data in the decoy file. In this manner, a CD-ROM which is authentically manufactured in accordance with this implementation includes one or more decoy data files that cannot be properly read by the optical head. A counterfeiter would not be able to distinguish between the decoy and the real files and thus would be frustrated trying to copy these files. Also the software developer attempting to prevent unauthorized reproduction of the master CD-ROM could, as a matter of course, try to access these files during installation, and if finding that they did not have an error, determine that the disc was not valid.

Figure 5:
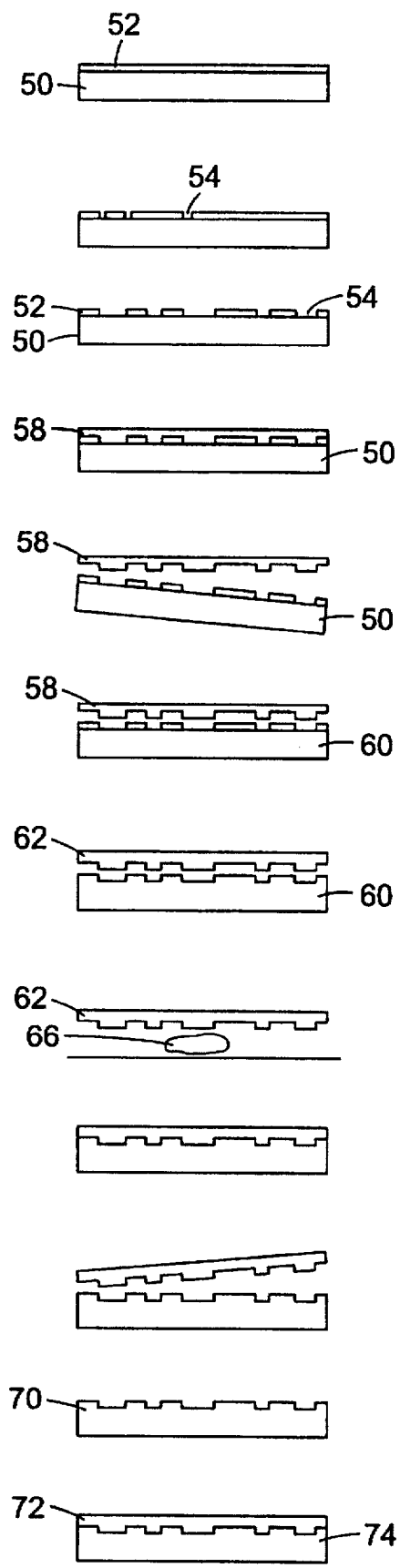
FIG. 5 illustrates a series of manufacturing steps, according to the prior art, which exemplify a manner in which a CD-ROM disc may be constructed.

Constructing the master CD-ROM disc in accordance with the present invention is best understood with respect to a typical construction of a conventional CD-ROM disc, as is now described in connection with FIG. 5. Construction of such a conventional disc begins with a standard CD-production glass substrate 50 having a read surface upon which a coating of photo-resist 52 is applied. Using recorded user data, a laser beam recorder is applied to expose selected areas of the resist coating, thereby forming, after subsequent processing, pits 54 to define the digital data to be recorded on the production discs. Further development of the exposed photoresist leads to metal deposition and electroforming processes for the purpose of creating a metal "father" 58 having a face molded from the breached photoresist. Using the metal "father", a mating metal "mother" 60 is formed using substantially the same process. The father 58 is used, or a stamper 62 is then developed, to form a limited number of CD-ROM disc molds from plastic 66 for producing replicate CD-ROM discs with the data corresponding to the original user data. A reflective metal 70 is then applied to the surface of each replicate, along with a protective layer 72, to provide the respective reflection for the laser readback head and protection for the read side of the CD-ROM disc 74.

The master CD-ROM disc, according to the present invention, is constructed using the same conventional methodology as described above, but with the data modified to accommodate the gaps and with the gaps accommodating a place for the barriers. The location, duration or length, and type of barriers are all controllable through various systems for various types of applications.

According to one embodiment, the barriers are formed as laser-burnt pits in a separate step immediately before or immediately after the laser is applied to breach selected areas of the resist coating and to define the digital data to be recorded on the production discs. In this embodiment, each metal stamper and CD-ROM disc produced therefrom will have identical sets of both digital data and barriers.

The barriers may also be formed by conventional machining processes or by laser etching.

Other alternative embodiments are equally advantageous for other applications. In one embodiment, the barriers are formed by abrasion or hot stamping on the surface of the metal "father." In another embodiment, which is useful in applications requiring that each barrier application have a unique fingerprint, the barriers are formed by abrasion, hot stamping or laser burning on the surface of CD-ROM disc sometime after the plastic molding of the disc. With each disc having a known unique arrangement of barriers, unauthorized replication is extremely difficult, expensive and/or readily detectable.

The barriers as described have different affects depending on the technical ability of the person trying to copy the data. The invention has an immediate effect on those trying to directly "clone" one disc onto a recordable disc or master. The read errors caused by the barriers will cause any such copy to abort. For those with technical ability, they will be able to copy the disc's data file by file. However, the resulting copy will not be an exact duplicate of the original in that file placement would be different (i.e., actual blocks where each disc starts) because the "gaps" put in for the barriers would be gone. Similarly, as discussed above, the decoy files are difficult to reconstruct. In addition the directory structure of the unauthorized copy will most likely be different in that it will have to be reconstructed.

In order to use the above attributes the software that is recorded on the disc may be written to check pertinent parameters before executing (or installing) the software on the CD-ROM. These parameters include: the propriety of the directory structure (e.g., number of data files, date and time); the placement of the data files (ensuring that the files start on the assigned block number); and whether there are any readable decoy files.

Accordingly, the present invention provides various embodiments to prevent unauthorized wholesale copying of a disc. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optically-readable data disc having at least one track along which data is recorded in the form of optically-readable patterns, comprising:

a plurality of data-placement zones;

a multitude of barriers constructed using a laser-application process which locates the barriers to provide a unique and nonrepeatable pattern of the barriers, and wherein the barriers are arranged along said at least one track and separating the data-placement zones;

a plurality of data files recorded along said at least one track in selected ones of the data-placement zones; and an address-information data file including data which identifies addresses of data files to be sequentially read in noncontiguous zones.

2. An optically-readable data disc having at least one track along which data is recorded in the form of optically-readable patterns, comprising:

a plurality of data-placement zones;

at least one read-blocking barrier constructed and arranged along said at least one track and separating the data-placement zones;

a plurality of data files recorded along said at least one track in selected ones of the data-placement zones;

a decoy file located along the track and arranged to provide evidence of reproduction authenticity; and an address-information data file including data which identifies addresses of data files to be sequentially read in noncontiguous zones.

3. An optically-readable data disc, according to claim 2, wherein the decoy file is corrupted by said at least one read-blocking barrier.

4. An optically-readable data disc having at least one track along which data is recorded in the form of optically-readable patterns, comprising:

a plurality of data-placement zones;

at least one read-blocking barrier constructed and arranged along said at least one track and separating the data-placement zones, wherein said at least one read-blocking barrier is located at gaps between the zones along the track;

a plurality of data files recorded along said at least one track in selected ones of the data-placement zones; and an address-information data file including data which identifies addresses of data files to be sequentially read in noncontiguous zones.

5. An optically-readable data disc, according to claim 1, wherein the address-information data file is a directory including a plurality of file pointers.

6. An optically-readable data disc, according to claim 1, wherein said multitude of barriers are constructed and arranged to derail sequential reading of two data files arranged adjacent to one another along the track.

7. An optically-readable data disc, according to claim 1, wherein said multitude of barriers are constructed and arranged using at least one pit in the track to derail sequential reading of two data files arranged adjacent to one another along the track.

8. An optically-readable data disc having at least one track along which data is recorded in the form of optically-readable patterns, comprising:

a plurality of data-placement zones;

at least one read-blocking barrier constructed and arranged along said at least one track and separating the data-placement zones;

a plurality of data files recorded along said at least one track in selected ones of the data-placement zones; and an address-information data file including data which identifies addresses of data files to be sequentially read in noncontiguous zones;

wherein said at least one read-blocking barrier is constructed and arranged as a hill across the track to derail sequential reading of two data files arranged adjacent to one another along the track.

9. An optically-readable data disc having at least one track along which data is recorded in the form of optically-readable patterns, comprising:

a plurality of data-placement zones along the track and including optically-readable data;

at least one test data file located along the track and between two adjacent zones;

at least one read-blocking barrier, located along said at least one track and separating the data-placement zones, constructed and arranged to derail sequential reading of two data files arranged adjacent to one another along the track;

a plurality of data files recorded along said at least one track in selected ones of the data-placement zones; and an address-information data file including data which identifies addresses of data files to be sequentially read in noncontiguous zones.

10. An optically-readable data disc, according to claim 9, wherein said at least one read-blocking barrier is located along the track with the test data file.

11. An optically-readable data disc, according to claim 10, wherein said test data file includes data that is corrupted when located along the track with said at least one read-blocking barrier.

12. An optically-readable data disc, according to claim 11, wherein said at least one read-blocking barrier is constructed as a hill across the track.

13. An optically-readable data disc, according to claim 11, wherein said at least one read-blocking barrier is constructed using at least one pit in the track.

* * * * *